(12) United States Patent
Lee et al.

(10) Patent No.: US 6,438,221 B1
(45) Date of Patent: Aug. 20, 2002

(54) ELECTRONOTE WALL MOUNTED MESSAGING DEVICE

(76) Inventors: David A. Lee, 5305 Crestedge La., Rockville, MD (US) 20853-2504; Joseph E. Buczek, 19170 Dowden Cir., Poolesville, MD (US) 20837

( * ) Notice: Subject to any disclaimer, the term of this patent is extended or adjusted under 35 U.S.C. 154(b) by 0 days.

(21) Appl. No.: 09/391,162

(22) Filed: Sep. 8, 1999

(51) Int. Cl.[7] .................. H04M 1/64; H04M 1/00; H04M 1/60
(52) U.S. Cl. .............. 379/159; 379/67.1; 379/88.12; 379/88.19; 379/160; 379/167.01; 379/167.02; 379/167.05; 379/167.11
(58) Field of Search .................... 379/32.01, 37, 379/67.1, 68, 75, 88.04, 88.12, 88.18, 88.22, 88.23, 159, 160, 161, 167.04, 167.05, 167.06, 167.07, 167.08, 167.11, 88.19

(56) References Cited

U.S. PATENT DOCUMENTS

| | | | | |
|---|---|---|---|---|
| 4,715,060 A | * | 12/1987 | Lipscher et al. | 379/70 |
| 4,757,525 A | * | 7/1988 | Matthews et al. | 379/88.12 |
| 4,975,896 A | * | 12/1990 | D'Agosto, III et al. | 369/29 |
| 5,394,445 A | * | 2/1995 | Ball et al. | 379/67.1 |
| 5,400,393 A | * | 3/1995 | Knuth et al. | 379/88.11 |
| 5,426,691 A | * | 6/1995 | Waldman | 379/67 |
| 5,657,380 A | * | 8/1997 | Mozer | 379/88.3 |
| 5,872,841 A | * | 2/1999 | King et al. | 379/209 |
| 6,021,181 A | * | 2/2000 | Miner et al. | 379/88.23 |
| 6,249,765 B1 | * | 6/2001 | Adler et al. | 704/500 |

* cited by examiner

*Primary Examiner*—Allan Hoosain
(74) *Attorney, Agent, or Firm*—John P. Halvonik

(57) ABSTRACT

A wall-hung or shelf situated free-standing voice memorandum system allows an individual to record a message for another member of the household. the system can be used in connection with a household doorbell system so that at the user's choice, the system either operates simply as a doorbell or when the door button is pressed plays at the door a greeting that the user has recorded, invites the visitor to leave voice messages for the household-and-records any messages given.

4 Claims, 4 Drawing Sheets

FIG. 3
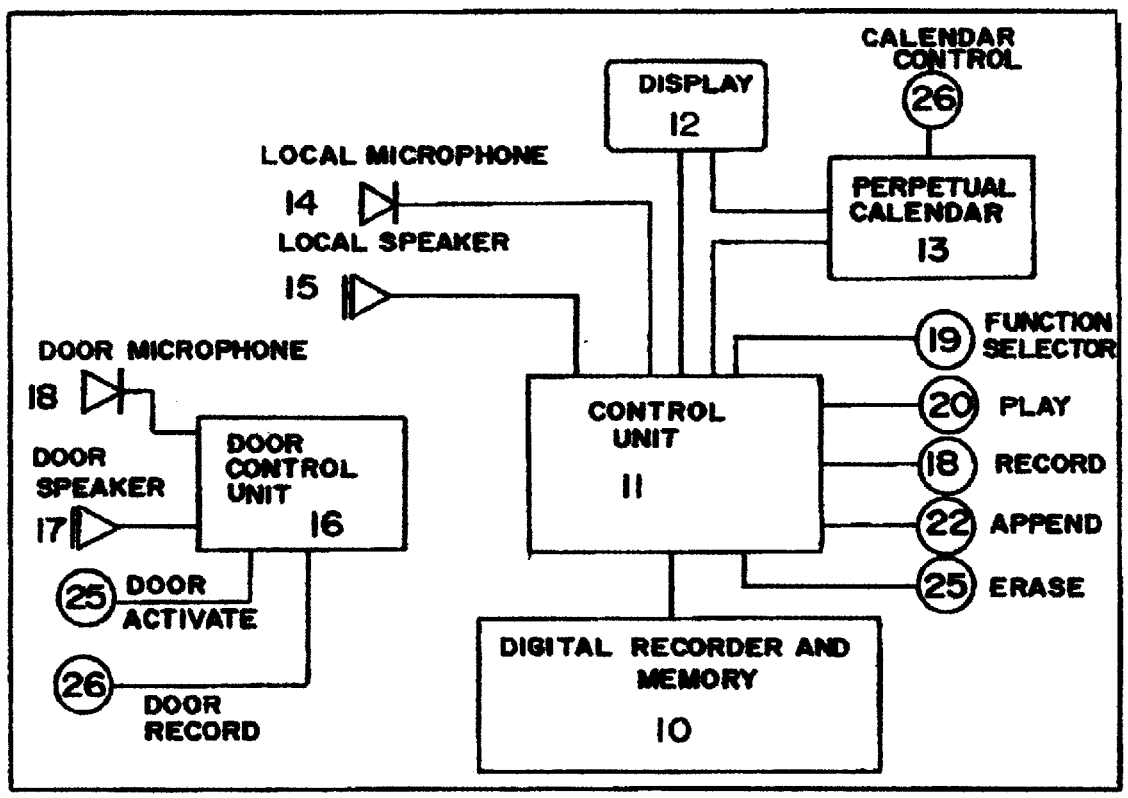
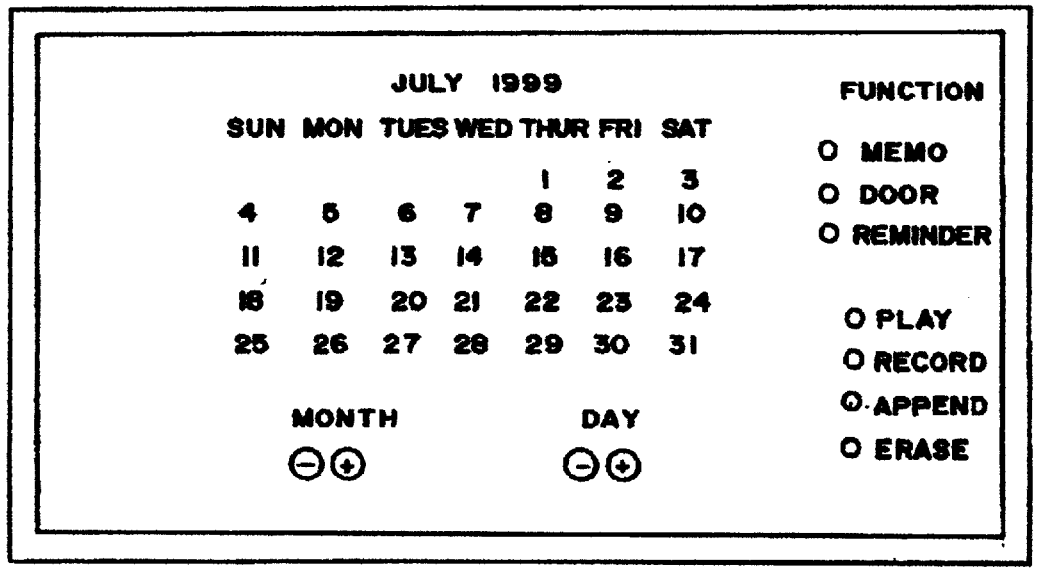
FIG. 4

ELECTRONOTE WALL MOUNTED MESSAGING DEVICE

BACKGROUND OF THE INVENTION

The invention relates to the field of messaging units that record and transmit recorded messages for future use by others. The present invention is designed to be mounted on walls or horizontal surfaces for domestic use, both indoors and out. Such units may use tape medium or microchip based medium and other media for recording relatively short message (perhaps 30 seconds to several minutes in length).

There is a need for a convenient, reliable system with which members of a household may leave messages for one another, and to add content to messages recorded earlier. Paper notepads are notoriously prone to lack paper; writing instruments are not always at hand, and composing a written message takes time and effort that busy people would be glad to avoid. In addition, individuals who find no one at home when they visit do not always have paper and pencil to leave a written message.

Finally, many households each year purchase calendars large enough to allow reminder messages associated with certain calendar dates. These paper calendars are not inexpensive; may not compliment a home's decor; and can be inconvenient at year end, when often two of them must be available in order to record notes for dates in the upcoming year.

The functions of the Electro Note or messaging device would include the ability for one to leave recorded messages and play them back including the ability to record, delete, playback or "add to," a message. "Adding to a message" is a capability where the person can record onto the end of the previously left message. The new additional message would appear at the end of the earlier messages. Say the user is a wife telling her husband the grocery list. After she finishes recording she remembers that she forgot one thing. " . . . and don't forget the eggs." Her new message is recorded at the end of the first.

Such functions can be implemented by the user pressing buttons or similar input devices in order to trigger the unit to begin the playback or other operation. Such abilities may also include the ability to turn off the outgoing message in the case where the unit may be mounted on the outside wall of a house. In such case, this would amount to the homeowner not wishing to leave a recorded message for a possible house caller. It is preferred that the device use battery power however, other methods of power are thought to be possible without violating the spirit of the invention.

Further mechanisms on the unit may include the use of lights in order to signal to a user when there is a recorded message that is meant for replay. Or when power is low, etc. Or to indicate whether certain modes or abilities of the unit have been disconnected.

The device may be constructed to be hung on a wall or to stand up on a desk or table near the home's entrance for the purpose of recording a message left by one person (a user) for another. Either person may be considered the "user." Either one or both may leave messages for the other as well as play them back.

It is thought that such a device could readily substitute for hand written notes left to friends and family as are used nowadays. For example, with this invention, a family member leaving the home would record a message for others pertaining to where he or she has gone and when they plan to return. A secondary application might be e.g. a similar device designed for external use that could be mounted near a home's entrance to record messages from visitors or delivery persons. A third application would be providing the device in offices where a person could leave a message for a person away from his or her desk.

It is believed that it will be easier and faster to leave a recorded message rather than a handwritten one. A person may be able to leave a more detailed and complete message for someone and in a more expeditious manner. It is believed that such a device would not have a great cost and thus would be desirable in most households. The unit may be constructed in a variety of sizes and styles suitable for outdoor and/or indoor use.

An exterior application of the invention would include means to allow an outside visitor to leave a recorded message for the person or user who is returning to the house at a later time. There may even be a capability for the user to leave a recorded message just for that visitor such as "we're not home."

SUMMARY OF THE INVENTION

The basic invention is summarized as a free-standing voice memorandum system. It allows an individual to record a message for another member of the household. In structure, it is a wall-hung or shelf situated decor enhancing recorder with a button for recording a message, a second button for playing messages, and a third button for appending added content to a previously recorded message. A message indicator light shows when an unplayed message or unplayed addition to a message is waiting.

An updated system expands the household's doorbell system so that at the user's choice, the system either operates simply as a doorbell or when the door button is pressed plays at the door a greeting that the user has recorded, invites the visitor to leave voice messages for the household and records any messages given. At the user's choice, this upgraded system can be connected to an existing doorbell switch, to expand the functionality of an existing doorbell system or the upgraded system can provide doorbell functions as well as voice memorandum functions as a stand alone unit. Connection between the system's door and interior components may be made with wires, or by radio links to simplify installation A further upgraded system in addition to providing voice memorandum and expanded doorbell functions also function as an electronic reminder system. In this version the device includes an electronic perpetual calendar and a system that allows the user to associate messages with specific calendar dates.

An advantage of the device's memorandum functions in comparison with paper notepads is the speed and convenience with which voice messages may be generated. Another advantage is it is self contained in nature: it requires no consumables such as writing instruments or paper.

One of the objects of the invention is to provide a messaging device that can be readily set up in a domestic environment such as the kitchen wall or perhaps the office where several related users frequently come and go and can easily detect and use the messaging system described herein. Such users may be in the same family or they may share a business office.

Another useful object of the invention is to provide a message device for outdoor use that can be automatically triggered by the presence of a caller at the front door. In such case, the recording unit would need to be wired to an outdoor detector such as a photocell or similar device for detecting the presence of someone at the front door. Detecting the presence of the person would send a signal from the unit at the front of the house back to the playback machine which would broadcast a greeting to the house caller similar to that on a telephone answering message. The house caller could respond by speaking into a microphone located at the front of the house and this message would be recorded for later play back by the user when he gets home and reviews his messages.

Other objectives of the invention will become apparent to those skilled in the art once the invention has been shown and described.

DESCRIPTION OF THE DRAWINGS

FIG. 3 System of FIG. 2 with perpetual calender for voice reminder functions;

FIG. 4 Function selector control, calendar control and the calendar display.

DESCRIPTION OF THE INVENTION

1. Voice Memorandum Functions

Figure 1:
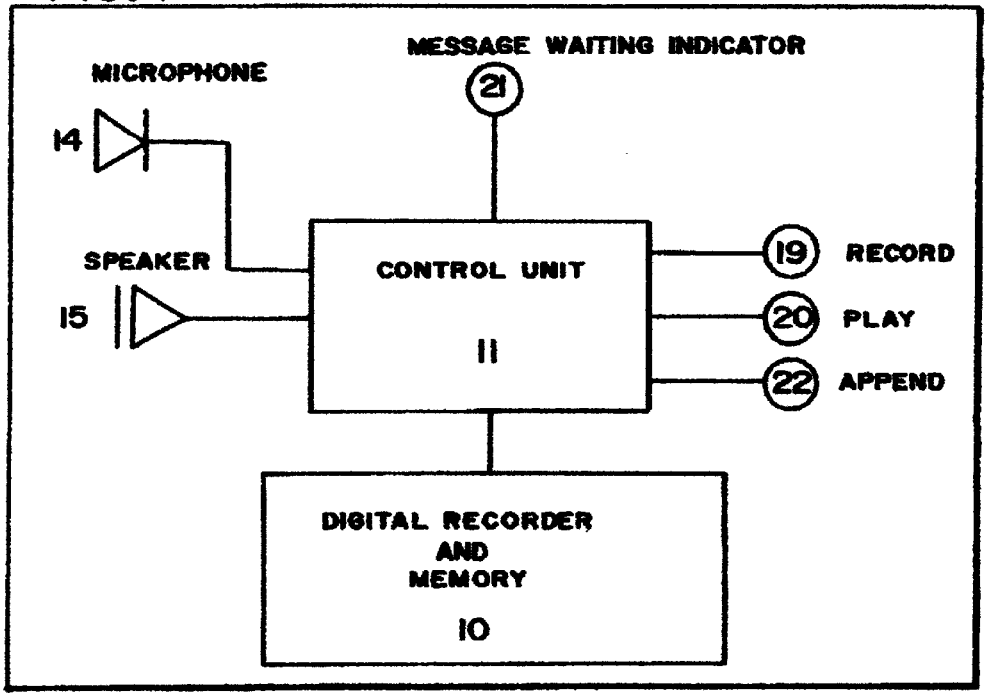
FIG. 1 Basic voice memorandum system.

As shown in FIG. 1, a control unit connects record, play, and append controls, a microphone, a speaker, and an indicator light, to a digital recorder and memory unit. Actuating the record control 19 erases any previous messages, sends output from the microphone 14 to the digital recorder and memory unit 10, and turns on the message-waiting indicator 21. Actuating the play control 20 sends the previously recorded message to the speaker 15, and turns the message-waiting indicator off.

Actuating the append control 22 appends output from the microphone 14 to the previously recorded message in the digital recorder and memory unit 10, and turns on the message-waiting indicator. Thus we may view the first message recorded on a digital medium as taking up a length of space on the digital medium.

Such a physical spatial length on the medium would of course correspond to the real time nature of the message. And of course, both the audible message and the digital bits stored on the media will have a beginning and an end. Appending a message is simply adding another audible portion to that audible portion already stored in the media. On the storage media then, the new appended message will physically come after the original message and further appended messages will add to these in serial fashion. In terms of real playback the same effect occurs, viz. any and all appended messages will follow the original message in serial fashion.

The warning light referred to above can function to indicate that a message has been recorded on the storage media and that it has not yet been played back. It may be flashing in nature or use other ways to indicate that one or more messages are waiting.

2. Voice Memorandum System with Additional Input Units

Figure 2:
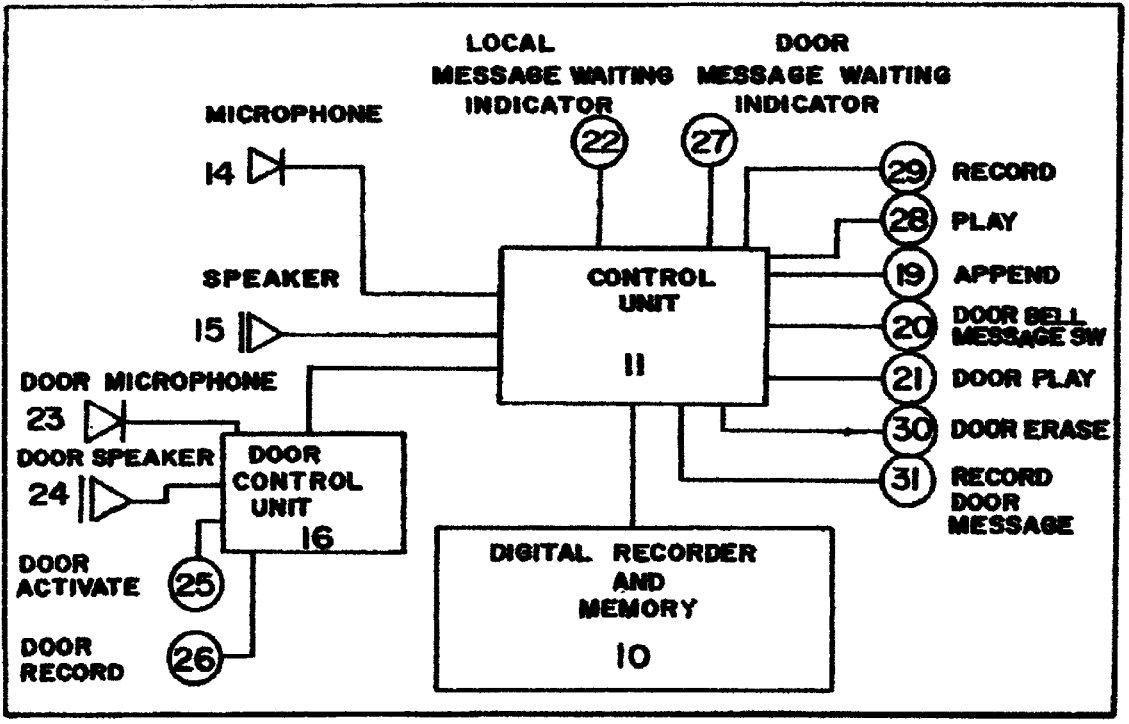
FIG. 2 Basic system with expanded doorbell functions.

FIG. 2 illustrates an additional input unit called the door unit. It includes a door control unit, door speaker, door microphone, door activate control, and door record control.

Operating the door activate control 25 causes the pre-recorded door greeting to play through the door speaker 24, inviting the user to leave a message.

The door activate control may be configured by connecting the door bell switch on the outside of the house with the control unit of the system inside the house, so that the user will activate a stored door greeting upon the activation of the door bell button. This most likely will be by transmission of the stored message through a speaker on the outside of the house.

Responding to the invitation in the door greeting, the visitor to the house may activate a door record control 26, which allows the appending of input from the door microphone to any door messages already in the digital recorder and memory unit 10, and turning on the door message-waiting indicator 27.

Or, alternately, activation of the pre existing doorbell may operate a visual indicator (such as a lighted message) on the outside of the house to signal the visitor to leave a voice message. In this case, the activation of the doorbell and visual indicator would then activate the outside microphone by sending a message to the control unit.

Activating the door play control 21 at the control unit, plays the door messages and turns off the door message-waiting indicator. The door erase control 30 erases all door messages, and turns off the door message-waiting indicator.

Using the door bell/message switch 20 on the control panel in the user's house, the user may choose to have the device simply play doorbell chimes through the speaker when a visitor presses the door activate control, and not play the pre recorded door greeting. When the user operates the record door message control 31, the system sends output from the microphone to the digital recorder and memory unit, storing it as the door greeting.

The door activate control is a normally open, momentary contact push button switch. Such doorbell systems are state of the art so that an existing door bell switch may be connected to the door unit and used as the door activate control. Connection between the system's door and interior components may be made with wires or by radio links to simplify installation. The door unit need not be a unit that is physically separate from the control unit, it may be built as sub system of the control unit.

3. Voice Memorandum and Reminder System with Additional Inputs

FIG. 3 shows the invention with more options including a voice memorandum and reminder system with additional memorandum inputs. The system employs a digital recorder and memory unit 10 integrated by a control unit 11 with a perpetual calendar 13 and a display unit 12 to associate recorded voice messages with specific calendar dates, or with a voice memorandum. Using the function selector control 19 the user may choose to operate the system's voice memorandum functions, its door functions, or its reminder functions.

If the user chooses to operate the memorandum functions, the play control 20, the record control 18 and the append control 22 operate as described in Section 1 above: "voice memorandum." The display unit provides a message waiting indicator for the memorandum functions.

If the user elects to operate the door functions, then the play and record controls, and the erase control 25 function as the "Door Play" "Record Door Message" and the "Door Erase" controls of FIG. 2, as described in section 2 above: "Voice memorandum system providing expanded doorbell functions." The display unit provides the message waiting indicator for door messages. The door activate control 25, door record control 26, door microphone 18, door speaker 17 and door control unit 16 function as described in section 2 above.

If the user chooses to operate the voice reminder functions, the display unit shows all the dates for a given period, such as one calendar month. This will be via a visual display of a monthly calender or similar increment of time that is controlled by the unit. Using the calendar control 26 the user selects a specific month and day for which messages will be recorded and played; known as the "active date."

The calendar display unit indicates the active date, for example, by emboldening the numeral of that date or by encircling the active date or by presenting a symbol beside the active date. The control for choosing a given date may be as simple as a forward or backward type of function that will move forward in time, day by day or backward in time to highlight each successive date. Thus the user can choose a given date and record a message corresponding to that date.

Activating the record control 18 sends output from the local microphone 14 into the digital recorder and memory unit 10, associated with the active date. Successive activations of the record control append successive reminder messages to those already recorded for the active date.

The calender display unit indicates which dates have messages, for example by presenting a symbol beside the numerals of those dates that have reminder messages. This will be shown when the user activates the visual calendar display for a given month—the active symbols will already be in place as flashing symbols or emboldening or what have you.

The user will select a given date using the same date selector as above or by a different one. Selecting a date and activating the play control 20 will play the messages associated with the active date chosen by the user. More than one message may be played as the serial append feature, described above, can be used with the date associated function described in this section. Again the appended messages will be played back in the order in which they were recorded. Activating the erase control 25 erases the last message played.

FIG. 4 shows an example of the function selector control, the calendar control and the calendar display. In this example, the calendar control consists of two pairs of buttons, one of which the month control, moves the displayed month ahead or back, while the other, the day control, moves the day ahead or back. The indicator for the active date in this example is emboldening of the active date. In FIG. 4 the active date is Jul. 6, 1999. The indication that reminder messages have been recorded for a date is an asterisk to the right of the dates numeral. In FIG. 4 there are reminders for July 1, July 14 and July 30.

4. Preferred Methods of Carrying Out the Invention

Digital record/playback component. The digital record/playback components shown as part 10 FIGS. 1, 2, and 3 are commercially available. AN example is the ISD 1000A Voice Record/Playback integrated circuit available as Radio Shack Catalog No. 276-1325. More than one ISD 1000A may be required to provide adequate message storage for the expanded doorbell functions, and for the voice reminder functions.

Figure 5:
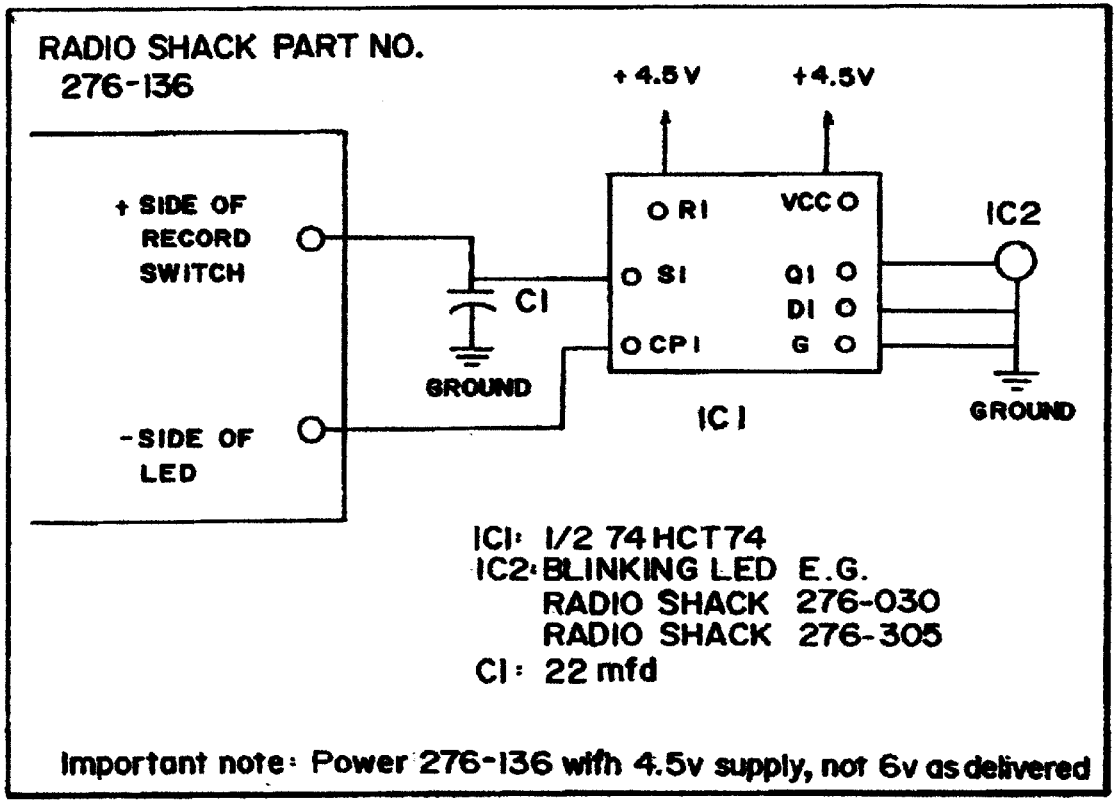
FIG. 5 Circuit to add message waiting functions for commercial digital voice recorder.
Figure 8:
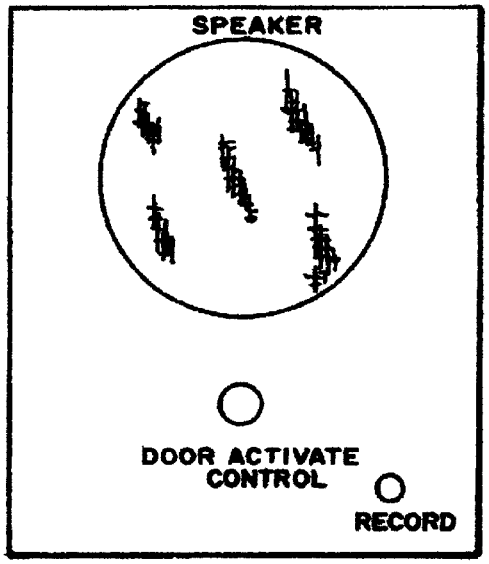
FIG. 8 Door unit.
Figure 6:
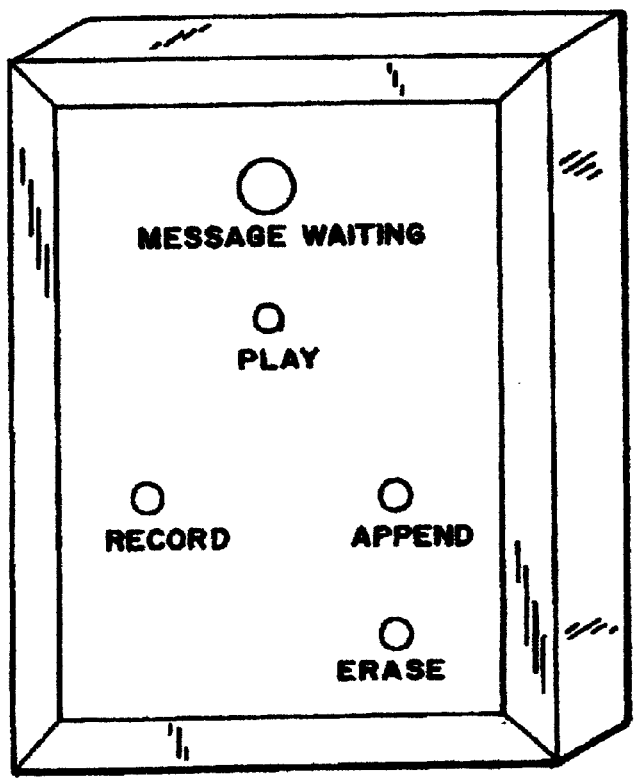
FIG. 6 Voice memorandum package as a wall hung unit.
Figure 7:
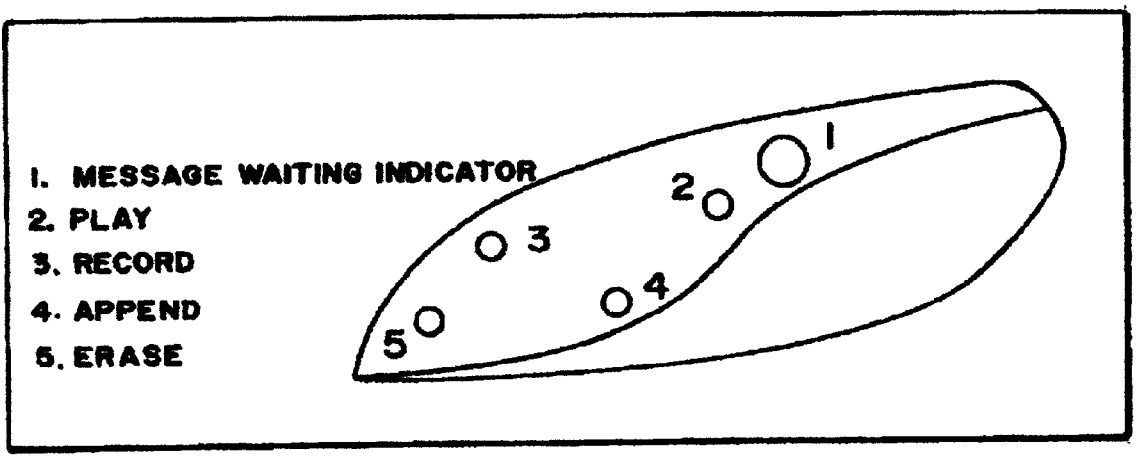
FIG. 7 Voice memorandum package as a desk or shelf unit.

Prewired digital voice record/playback units also are available. On example is the DIgital Voice Recorder sold by Radio Shack, Catalog No. 276-1326. This device does not provide all the voice memorandum functions described in section 1 above. It does not allow the user to append new content to an existing message and it does not provide a message waiting indicator. The circuit shown in FIG. 5 adds a message waiting indicator to this device.

We claim:

1. A voice record and messaging system that is used in connection with a house having an outside doorway area and an intercom in association with the doorway area, said system comprising the following: a control unit in connection with a recorder having means to record audible messages in a media chosen from the following: tape or digital electronic media; a microphone in connection with said means to record and a speaker in connection with said media, said control unit having controls for activation of said means to record so as to record an audible memorandum message having a beginning and end on said digital media, said unit having a means to provide a visual alert when said audible memorandum message has been recorded; said control unit having an append means for adding one or more further audible messages at the end of said memorandum message said audible messages to be appended to the end of each message on the media in serial fashion; and said control unit in connection with a means to play back through said speaker said audible message and any append messages and said control unit having a deleting function for deleting said recorded audible messages; said system in connection with a household door bell system having a door bell and an electronic means for activating said doorbell said electronic means for activating in connection with the outside of the house; said system further comprising said control unit having a means to record an audible greeting message on said media upon the activation of a door message record control; said control unit in connection with an outside speaker in connection with the doorway area of the house and said control unit having a means for playing back said greeting message through said outside speaker upon the activation of said doorbell button.

2. The system of claim 1 wherein said control unit has a means to record visitor messages, said means to record visitor messages in connection with the doorway area of the house; said control unit having a means for storing said visitor messages onto a medium; said apparatus having an activation means in connection with said control unit for playing back said audible visitor message.

3. The apparatus of claim 2 having a calendar depiction having a means to depict the days, weeks and months of a given increment of time; said calendar depiction having a means to associate a symbolic visual identifier with a single day of said increment of time; said control unit having a means for associating a single message stored in said media with a particular day of said increment of time and for further associating said symbolic visual identifier with that particular day in said calendar depiction; said control unit having a means to replay a particular audible message that is associated with a particular day in said calendar depiction.

4. The system of claim 2 having an indicator light in connection with said control unit, said indicator light for providing a visual indication upon a visitor message being recorded on said medium, and having a means to deactivate said visual indicator when said visitor message has been replayed through said speaker.

\* \* \* \* \*